Patented June 25, 1940

2,206,005

UNITED STATES PATENT OFFICE 2,206,005

PRODUCTION OF AMINOTRIAZINES

John M. Grim, Stamford, Conn., assignor to American Cyanamid Company, New York, N. Y., a corporation of Maine No Drawing. Application May 25, 1939, Serial No. 275,659

10 Claims. (Cl. 260—248)

This invention relates to the production of aminotriazines such as melamine, ammeline, and ammelide or mixtures containing these materials. More specifically, the invention deals with the heat conversion of dicyandiamide to aminotriazines in the presence of alkalies stronger than ammonia. I have found that the conversion of dicyandiamide and materials producing dicyandiamide such as cyanamide, calcium cyanamide and the like to aminotriazine-containing materials is promoted and controlled by the presence of strong alkalies such as the hydroxides and carbonates of the alkali metals. The presence of alkalies causes the reaction to proceed in such a manner that good yields of melamine and alkali-soluble conversion products are obtained and only relatively small amounts of such insoluble compounds as melem, melam and mellon.

It is known that the conversion of dicyandiamide to aminotriazines is a strongly exothermic reaction, and that some means of temperature control must be provided in order to obtain substantial quantities of melamine in the reaction product. The principles of my invention are especially well adapted for conversion processes employing liquid temperature controlling media such as high boiling organic solvents, for such liquids facilitate an intimate admixture and uniform reaction between the dicyandiamide and the alkali. I have found, however, that the conversion of dicyandiamide to melamine, ammeline and ammelide can also be carried out in the presence of gases or vapors of good heat capacity, such as hot air when the dicyandiamide is first intimately mixed with 5–25% of its weight of an alkali metal hydroxide, and this constitutes another feature of the invention.

When dicyandiamide is heated above it melting point either in the dry state or in the presence of an anhydrous liquid such as a high boiling organic solvent, substantial quantities of ammonia are given off and the reaction product contains considerable quantities of water- and alkali-insoluble deamination products of melamine such as melem, melam and the like. In these ordinary conversion processes the yields of melamine and ammeline are reduced to about 40–50% by the formation of these insoluble deamination products. When the same reaction is carried out in the presence of a liquid heating medium and an alkali stronger than ammonia, the formation of insoluble deamination products is reduced in most cases to less than 10%, and correspondingly greater yields of melamine, ammeline and ammelide are obtained.

While any suitably strong alkali may be employed in practicing the invention I have found that the best results are obtained by using alkali metal hydroxides such as sodium or potassium hydroxide in amounts equal to about 5–25% of the dicyandiamide charged and preferably in amounts of 8–9%. I believe that the improved results obtainable with the alkali metal hydroxides are due to the fact that these compounds tend to inhibit the formation of melamine deamination products having condensed nuclei, such as melem, melam and the like by the formation of melamine and alkali metal salts of ammeline and ammelide, but the invention is not limited to this theory of operation. It is possible that the improved results obtainable by the use of strong alkalies may be wholly or partly due to other causes, and the invention includes any dicyandiamide conversion process employing these reagents, irrespective of the mechanism of the reaction involved.

Since the presence of an alkali during the dicyandiamide conversion results in a reaction product containing all of its most valuable constituents in the form of melamine and alkali-soluble materials, a further important advantage of the invention resides in the provision of a very cheap and efficient method for preparing substantially pure melamine from the crude reaction product. To accomplish this purpose it is only necessary to employ sufficient alkali metal hydroxide or carbonate in the reaction to form the alkali metal salt of all the ammeline and ammelide produced, and then to extract the reaction mixture with water after separating it from the liquid heating medium if necessary. The alkali metal salts of ammeline and ammelide being water-soluble are separated from the relatively insoluble melamine and it is only necessary to wash the filter cake with cold water to obtain melamine of a high degree of purity. The ammeline and ammelide are easily recovered from the filtrate by neutralizing it with carbon dioxide, mineral acids or the like and filtering off the precipitate so obtained.

The invention will be described in greater detail by the following specific examples. It should be understood, however, that although these examples show certain of the more specific details of the invention they are given primarily for purposes of illustration and that the invention in its broader aspects is not limited thereto.

*Example 1*

50 parts of dicyandiamide and 5 parts of 85% potassium hydroxide are dispersed in 100 parts of benzyl alcohol (B. P. 204.7° C.) and the mixture is heated with agitation. When a temperature of 170° C. is reached an exothermic reaction sets in which carries the temperature of the mixture to about 200° C. The mixture is maintained at about this temperature for about 5 minutes, during which time ammonia is evolved and a product containing melamine precipitates rapidly from the solution.

The product, which is a fine white powder, is washed with an equal weight of ethyl alcohol to remove the benzyl alcohol and is then stirred into 100 parts of water to dissolve out potassium ammeline, leaving most of the melamine as a precipitate. The mixture is filtered and washed with cold water whereby melamine of 98–99% purity is obtained in yields of 80% based on the weight of the dicyandiamide originally used.

Upon neutralizing the filtrate from the water extraction with carbon dioxide and filtering off the precipitate, 9 parts of a fine white powder are obtained. This material is extremely heat-stable and is principally ammeline.

Similar results are obtained when sodium hydroxide is used instead of potassium hydroxide, following the above procedure, with the exception that 68–70% yields of melamine and 25–30% yields of ammeline are obtained.

Example 2

50 parts of dicyandiamide and 5 parts of solid potassium hydroxide containing 85% KOH and 15% water were added to 100 parts of benzyl alcohol and the mixture was refluxed for 20 minutes. The benzyl alcohol was then distilled off under reduced pressure, an almost complete recovery of the solvent being obtained.

54 parts of a solid product were obtained which was found to contain 76% of melamine and 18% of ammeline when extracted with water and filtered as described in the preceding example.

Example 3

The procedure of Example 1 was repeated using 8.5% of 100% potassium hydroxide, based on the weight of the dicyandiamide, and 100 parts of phenyl ether of ethylene glycol (B. P. 245° C.) as solvent. The reaction carried the temperature to about 240° C. A 79% yield of melamine of 98–99% purity was obtained.

Example 4

50 parts of dicyandiamide were dissolved in 100 parts of benzyl alcohol and 11.8 parts of 85% potassium hydroxide were added. The mixture was heated as before to about 165° C., whereupon a vigorous exothermic reaction set in and the temperature rose to about 200° C. Upon completion of the reaction the product was filtered off, freed from benzyl alcohol and stirred into water as before. Upon filtration and drying a 60% yield of melamine was obtained together with 38% of a by-product containing the potassium salts of ammeline and ammelide.

Example 5

50 parts of dicyandiamide were dissolved in 100 parts of benzyl alcohol as before and 10 parts of 100% potassium carbonate were added. Reaction set in upon heating to 175° C. and at its completion the reaction product was filtered off, freed from alkali-soluble material and dried. A 66% yield of substantially pure melamine was obtained.

Example 6

The procedure of Example 1 was repeated using 100 parts of the ethyl ether of ethylene glycol (B. P. 135° C.) as solvent and heating medium. A 67% yield of substantially pure melamine was obtained, based on the amount of dicyandiamide used.

Example 7

50 parts of dicyandiamide and 5 parts of 85% potassium hydroxide were intimately mixed and added to 100 parts of molten naphthalene which had been heated to 150° C. Heat was applied until a vigorous reaction started at 170–175° C. The temperature then rose rapidly to 215° C. and was maintained at this point by the heat of reaction during contiguous agitation of the mixture. When the reaction was completed the naphthalene was poured off and the solid reaction product ground and extracted with acetone to remove excess naphthalene. It was then sludged up with water and the suspension was filtered. A 60% yield of melamine was obtained by this method, based on the weight of the dicyandiamide originally used.

What I claim is:

1. A method of preparing aminotriazines which comprises heating dicyandiamide in a non-aqueous liquid medium in the presence of 5–25% of its weight of an alkali stronger than ammonia.

2. A method of preparing aminotriazines which comprises heating dicyandiamide with 5–25% of its weight of an alkali metal hydroxide and with the exclusion of substantial amounts of water.

3. A method of preparing aminotriazines which comprises heating a solution of dicyandiamide in a high boiling organic solvent in the presence of 5–25% of its weight of an alkali stronger than ammonia.

4. A method of preparing aminotriazines which comprises heating dicyandiamide in a non-aqueous liquid medium in the presence of 8–9% of its weight of an alkali stronger than ammonia.

5. A method of preparing aminotriazines which comprises heating dicyandiamide with 8–9% of its weight of an alkali metal hydroxide and with the exclusion of substantial amounts of water.

6. A method of preparing aminotriazines which comprises heating dicyandiamide with 8–9% of its weight of potassium hydroxide and with the exclusion of substantial amounts of water.

7. A method of preparing aminotriazines which comprises heating dicyandiamide in a non-aqueous liquid medium in the presence of 8–9% of its weight of potassium hydroxide.

8. A method of preparing melamine which comprises heating dicyandiamide in non-aqueous liquid in the presence of 5–25% of its weight of an alkali stronger than ammonia until aminotriazine formation is substantially completed, separating the reaction product from the liquid medium, and extracting the product with water.

9. A method of preparing melamine which comprises heating dicyandiamide with 5–25% of its weight of an alkali metal hydroxide with exclusion of substantial amounts of water and extracting the product with water.

10. A method of preparing melamine which comprises heating dicyandiamide with 5–25% of its weight of potassium hydroxide with exclusion of substantial amounts of water and extracting the product with water.

JOHN M. GRIM.